United States Patent
Hafner et al.

(10) Patent No.: US 12,296,845 B2
(45) Date of Patent: May 13, 2025

(54) VEHICLE PATH ADJUSTMENT WITH CONTROL BARRIER FUNCTION

(71) Applicant: Ford Global Technologies, LLC, Dearborn, MI (US)

(72) Inventors: Michael Hafner, San Carlos, CA (US); Mohit Srinivasan, Ann Arbor, MI (US); Abhishek Sharma, West Bloomfield, MI (US); Mrdjan J. Jankovic, Birmingham, MI (US); Erol Dogan Sumer, Ann Arbor, MI (US); Alexander Jaeckel, Ann Arbor, MI (US); Aakar Mehra, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 17/750,434

(22) Filed: May 23, 2022

(65) Prior Publication Data

US 2023/0150532 A1    May 18, 2023

Related U.S. Application Data

(63) Continuation-in-part of application No. 17/527,207, filed on Nov. 16, 2021.

(51) Int. Cl.
*B60W 10/20*  (2006.01)
*B60W 10/18*  (2012.01)
(Continued)

(52) U.S. Cl.
CPC .......... *B60W 60/001* (2020.02); *B60W 10/18* (2013.01); *B60W 10/20* (2013.01);
(Continued)

(58) Field of Classification Search
CPC ............ B60W 60/01; B60W 2554/20; B60W 2554/402; B60W 2554/4041;
(Continued)

(56) References Cited

U.S. PATENT DOCUMENTS

| 9,568,915 B1 | 2/2017 | Berntorp et al. |
| 9,964,952 B1 | 5/2018 | Costa et al. |

(Continued)

FOREIGN PATENT DOCUMENTS

| CN | 110196599 B | 8/2020 |
| CN | 111791898 B | 7/2021 |

(Continued)

OTHER PUBLICATIONS

Non-Final Office Action for U.S. Appl. No. 17/527,207, filed Nov. 16, 2021, as issued by the USPTO Jun. 22, 2023.

(Continued)

*Primary Examiner* — Jess Whittington
*Assistant Examiner* — Rami Nabih Bedewi
(74) *Attorney, Agent, or Firm* — Frank A. MacKenzie; Brooks Kushman P.C.

(57) ABSTRACT

A system for detecting a road surface includes a computer programmed to determine a virtual boundary for a vehicle body based on a shape of the vehicle body, upon identifying an object, to identify a plurality of points on the object based on received sensor data, to determine a barrier function based on each of the identified plurality of points, wherein the barrier function includes a barrier distance from a reference point of the virtual boundary of the vehicle to a respective one of the points on the object, based on (i) the determined barrier functions, (ii) the determined virtual boundary of the vehicle, and (iii) an input to at least one of propulsion, steering, or braking, to determine at least one of a braking override or a steering override, and based on the (Continued)

determination, to adjust at least one of a vehicle steering or a vehicle speed.

19 Claims, 8 Drawing Sheets

(51) Int. Cl.
  *B60W 30/09* (2012.01)
  *B60W 60/00* (2020.01)
(52) U.S. Cl.
  CPC ... *B60W 2554/20* (2020.02); *B60W 2554/402* (2020.02); *B60W 2554/4041* (2020.02); *B60W 2554/4044* (2020.02); *B60W 2554/80* (2020.02)
(58) Field of Classification Search
  CPC ..... B60W 2554/4044; B60W 2554/80; B60W 10/18; B60W 10/20
  See application file for complete search history.

(56) References Cited

U.S. PATENT DOCUMENTS

| | | | |
|---|---|---|---|
| 9,983,306 | B2 | 5/2018 | Zeng et al. |
| 10,671,076 | B1 | 6/2020 | Kobilarov et al. |
| 2012/0025964 | A1 | 2/2012 | Beggs et al. |
| 2015/0293216 | A1* | 10/2015 | O'Dea ................. B60W 30/02 701/23 |
| 2017/0315549 | A1 | 11/2017 | Oppolzer |
| 2017/0345308 | A1 | 11/2017 | Buburuzan et al. |
| 2017/0372618 | A1 | 12/2017 | Xu et al. |
| 2018/0056998 | A1 | 3/2018 | Benosman et al. |
| 2018/0074505 | A1 | 3/2018 | Lv et al. |
| 2018/0150081 | A1 | 5/2018 | Gross et al. |
| 2018/0364787 | A1 | 12/2018 | Fukumoto |
| 2019/0025851 | A1 | 1/2019 | Ebrahimi Afrouzi |
| 2019/0049968 | A1 | 2/2019 | Dean et al. |
| 2020/0117200 | A1 | 4/2020 | Akella et al. |
| 2020/0117206 | A1 | 4/2020 | Egnor et al. |
| 2020/0225670 | A1 | 7/2020 | Jankovic et al. |
| 2021/0053563 | A1 | 2/2021 | Li et al. |
| 2021/0331676 | A1* | 10/2021 | Wu ....................... B60W 50/00 |
| 2022/0204029 | A1* | 6/2022 | Chen ....................... G01S 17/42 |
| 2022/0379478 | A1* | 12/2022 | Raghunathan ......... B25J 9/1676 |
| 2023/0041031 | A1* | 2/2023 | Baldan ................ B60W 60/001 |

FOREIGN PATENT DOCUMENTS

| | | |
|---|---|---|
| KR | 100578942 B1 | 5/2006 |
| WO | 2017197170 A1 | 11/2017 |

OTHER PUBLICATIONS

Final Office Action for U.S. Appl. No. 17/527,207, filed Nov. 16, 2021, as issued by the USPTO Nov. 30, 2023.

Kiangru Xu, "Constrained Control of Input-Output Linearizable Systems Using Control Sharing Barrier Functions", Department of Electrical Engineering and Computer Science, University of Michigan, Ann Arbor, MI (2017) (7 pages).

Trautman, et. al., "Unfreezing the Robot: Navigation in Dense, Interacting Crowds", IEEE/RSJ International Conference on Intelligent Robots and Systems (2010) (7 pages).

Snape, et. al., "The Hybrid Reciprocal Velocity Obstacle", IEEE Transactions on Robotics, vol. 27, No. 4 (Aug. 2011) (pp. 696-706.

Kim, et. al., "Game Theory Based Autonomous Vehicles Operation", International Journal of Vehicle Design (IJVD), vol. 65, No. 4 (2014) (24 pages).

Hassan, et. al., "A Fully-Distributed Heuristic Algorithm for Control of Autonomous Vehicle Movements at Isolated Intersections", International Journal of Transportation Science and Technology, vol. 3, No. 4 (2014), pp. 297-310 (13 pages).

Borrmann, et. al., "Control Barrier Certificates for Safe Swarm Behavior", IFAC PapersOnLine 48-27 (2015), pp. 68-73 (6 pages).

* cited by examiner

VEHICLE PATH ADJUSTMENT WITH CONTROL BARRIER FUNCTION

CROSS-REFERENCE TO RELATED APPLICATION

This application is a continuation-in-part of, and as such claims priority to, U.S. patent application Ser. No. 17/527,207, filed on Nov. 16, 2021, which is hereby incorporated by reference in its entirety.

BACKGROUND

Computers can provide commands to operate vehicles autonomously or semi-autonomously. Other vehicles, both moving and non-moving, as well as other moving and/or non-moving objects, e.g., a bicycle, a pedestrian, etc., may be present in an area where a first or host vehicle operates. Planning a path for the host vehicle, especially when taking into account possible paths of other moving objects, can be challenging.

DETAILED DESCRIPTION

Introduction

Figure 1:
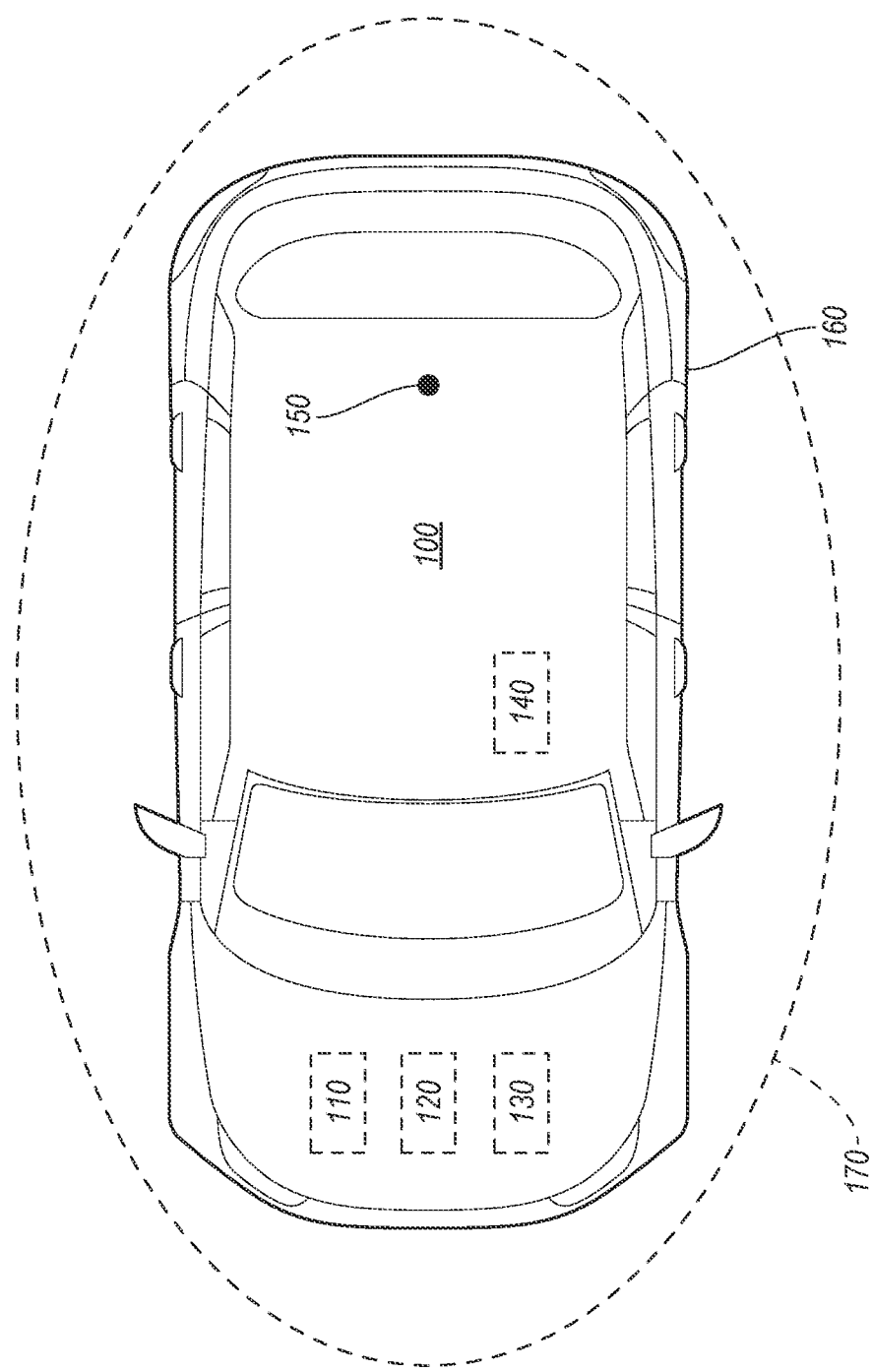
FIG. 1 is a diagram showing an example vehicle with a virtual boundary.

Disclosed herein is a system for detecting a road surface. The system includes a processor and a memory. The memory stores instructions executable by the processor to determine a virtual boundary for a vehicle body based on a shape of the vehicle body, upon identifying an object, identify a plurality of points on the object based on received sensor data, to determine a barrier function based on each of the identified plurality of points, wherein the barrier function includes a barrier distance from a reference point of the virtual boundary of the vehicle to a respective one of the points on the object, based on (i) the determined barrier functions, (ii) the determined virtual boundary of the vehicle, and (iii) an input to at least one of propulsion, steering, or braking, to determine at least one of a braking override or a steering override, and based on the determination, adjust at least one of a vehicle steering or a vehicle speed.

The object may be a static object or a moving object.

The plurality of points may include points on edges of the object.

The instructions may further include instructions to generate tracking data for the identified object and determine based on the generated tracking data whether the identified object is a static object.

The instructions may further include instructions to determine the at least one of a braking override or a steering override by solving an optimization problem to identify a set of actuations of one or more vehicle actuators that satisfy the barrier functions.

The instructions may further include instructions to determine a projection of the object on a ground surface based on the identified first plurality of points, and to determine the at least one of a braking override or a steering override further based on the determined projection of the object.

The instructions may further include instructions to determine a plurality of radial zones extending from the virtual boundary, and upon determining that the object is a static object, identify the plurality of points on the static object based on received virtual sensor data from one or more radial zones.

The plurality of points may be on more than one identified static object.

The instructions may further include instructions upon determining that the object is a moving object, to generate tracking data for the plurality of points on the identified moving object, to determine a speed, a heading, and a location of each of the identified plurality of points of the moving object based on the vehicle sensor data, and to determine the barrier function further based on the determined state of each of the identified plurality of points.

The instructions may further include instructions to determine a second virtual boundary for the identified object based on the plurality of points on the identified object.

The instructions may further include instructions to determine the second virtual boundary based on data, received from a vehicle sensor or a remote computer, identifying a type of the identified object.

The instructions may further include instructions to determine at least one of the braking override or the steering override by solving an optimization problem including the barrier functions and one or more constraints including at least one of a maximum deceleration threshold, a maximum acceleration threshold, and a maximum steering angle.

Further disclosed herein is a method, comprising determining a virtual boundary for a vehicle body based on a shape of the vehicle body, upon identifying an object, identifying a plurality of points on the object based on received sensor data, determining a barrier function based on each of the identified plurality of points, wherein the barrier function includes a barrier distance from a reference point of the virtual boundary of the vehicle to a respective one of the points on the object, based on (i) the determined barrier functions, (ii) the determined virtual boundary of the vehicle, and (iii) an input to at least one of propulsion, steering, or braking, determining at least one of a braking override or a steering override, and based on the determination, adjusting at least one of a vehicle steering or a vehicle speed.

The method may further include comprising generating tracking data for the identified object and determining based on the generated tracking data whether the identified object is a static object.

The method may further include determining the at least one of a braking override or a steering override by solving an optimization problem to identify a set of actuations of one or more vehicle actuators that satisfy the barrier functions.

The method may further include determining a projection of the object on a ground surface based on the identified first plurality of points and determining the at least one of a braking override or a steering override further based on the determined projection of the object.

The method may further include determining a plurality of radial zones extending from the virtual boundary, and upon determining that the object is a static object, identifying the plurality of points on the static object based on received virtual sensor data from one or more radial zones.

The method may further include upon determining that the object is a moving object, generating tracking data for the plurality of points on the identified moving object, determining a speed, a heading, and a location of each of the identified plurality of points of the moving object based on the vehicle sensor data, and determining the barrier function further based on the determined state of each of the identified plurality of points.

The method may further include determining a second virtual boundary for the identified object based on the plurality of points on the identified object.

The method may further include determining the second virtual boundary based on data, received from a vehicle sensor or a remote computer, identifying a type of the identified object.

Further disclosed is a computing device programmed to execute any of the above method steps.

Yet further disclosed is a computer program product, comprising a computer-readable medium storing instructions executable by a computer processor, to execute any of the above method steps.

Exemplary System Elements

A vehicle may traverse a path by actuating vehicle propulsion, braking, and/or steering. The vehicle may be operated by a human operator and/or a computer based on a variety of data, e.g., data about a presence and/or movement of other objects such as vehicles, bicycles, pedestrians, etc. To address technical challenges arising in planning and/or executing a path for a vehicle, a vehicle computing device can include programming to determine a virtual boundary for a vehicle body based on a shape of the vehicle body, identify one or more objects based on vehicle sensor data, and then, based on the detected one or more objects, the determined virtual boundary, and an input to at least one of propulsion, steering, or braking, to determine at least one of a braking override, acceleration override, or a steering override, and further, based on the determination, can perform at least one of adjusting a vehicle steering and a vehicle speed.

FIG. 1 illustrates an example vehicle 100. The vehicle 100 may be powered in a variety of ways, e.g., with an electric motor and/or internal combustion engine. The vehicle 100 may be a land vehicle such as a car, truck, etc. A vehicle 100 may include a computer 110, actuator(s) 120, sensor(s) 130, and a human-machine interface (HMI 140). A reference point 150 can be defined with respect to the vehicle 100, e.g., the illustrated reference point 150 is within the space defined by a vehicle 100 body 160, and is a geometrical center point, i.e., a point at which respective longitudinal and lateral center axes of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and/or steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations. As discussed below, the computer can include programming to override a human operator or an autonomous vehicle control system, e.g., by actuating a brake, propulsion, and/or steering actuator. For example, the computer 110 may be programmed to execute instructions of an autonomous vehicle control system to operate the vehicle and additionally be programmed based on the techniques disclosed herein to override an operation of the autonomous vehicle control system programmed based on specified conditions, as discussed below. In another example, a first computer 110 may be programmed to operate the vehicle autonomously and a second computer 110 may be programmed to override actuation of the first computer 110 when specific conditions are satisfied. In yet another example, a first computer 110 may operate the vehicle based on inputs received from a human operator and a second computer 110 may be programmed based on the techniques herein to override human user actuation commands when specific conditions are satisfied.

The computer 110 may include or be communicatively coupled to (e.g., via a vehicle 100 communications bus as described further below) more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a wireless vehicular communication interface with other traffic objects (e.g., vehicles, infrastructure, pedestrian, etc.), e.g., via a vehicle-to-vehicle communication network and/or a vehicle-to-infrastructure communication network. The vehicular communication network represents one or more mechanisms by which the computers 110 of vehicles 100 may communicate with other traffic objects, and may be one or more of wireless communication mechanisms, including any desired combination of wireless (e.g., cellular, wireless, satellite, microwave and radiofrequency) communication mechanisms and any desired network topology (or topologies when multiple communication mechanisms are utilized). Exemplary vehicular communication networks include cellular, Bluetooth®, IEEE 802.11, dedicated short-range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100. The computer 110 may be programmed to actuate the vehicle 100 actuators 120 including propulsion, steering, and/or braking actuators 120 based on the planned acceleration.

The sensors 130 may include a variety of devices known to provide data to the computer 110. For example, the sensors 130 may include object detection sensors 130 such as Light Detection And Ranging (LIDAR) sensor(s) 130 disposed on a top of the vehicle 100 that provide relative locations, sizes, and shapes of one or more targets 200 (or objects) surrounding the vehicle 100, e.g., second vehicles, bicycles, pedestrians, robots, drones, etc., traveling next to, ahead, or behind of the vehicle 100. As another example, one or more radar sensors 130 fixed to vehicle 100 bumpers may provide locations of the target(s) 200 relative to the location of the vehicle 100.

The object detection sensors 130 may include camera sensor(s) 130, e.g. to provide a front view, side view, etc., providing images from an area surrounding the vehicle 100. For example, the computer 110 may be programmed to receive image data from a camera sensor(s) 130 and to implement image processing techniques to detect a road, infrastructure elements, etc. The computer 110 may be further programmed to determine a current vehicle 100 location based on location coordinates, e.g., GPS coordinates, received from a vehicle 100 location (e.g., GPS) sensor 130.

The HMI 140 may be configured to receive input from a user during operation of the vehicle 100. Moreover, an HMI 140 may be configured to provide output to the user. The HMI 140 is typically located in the passenger compartment of the vehicle 100. In one example, the computer 110 may be programmed to receive destination a destination location, from the HMI 140. The destination location can be specified according to geocoordinates or the like, e.g., according to map data stored in the vehicle 100.

Figure 2:
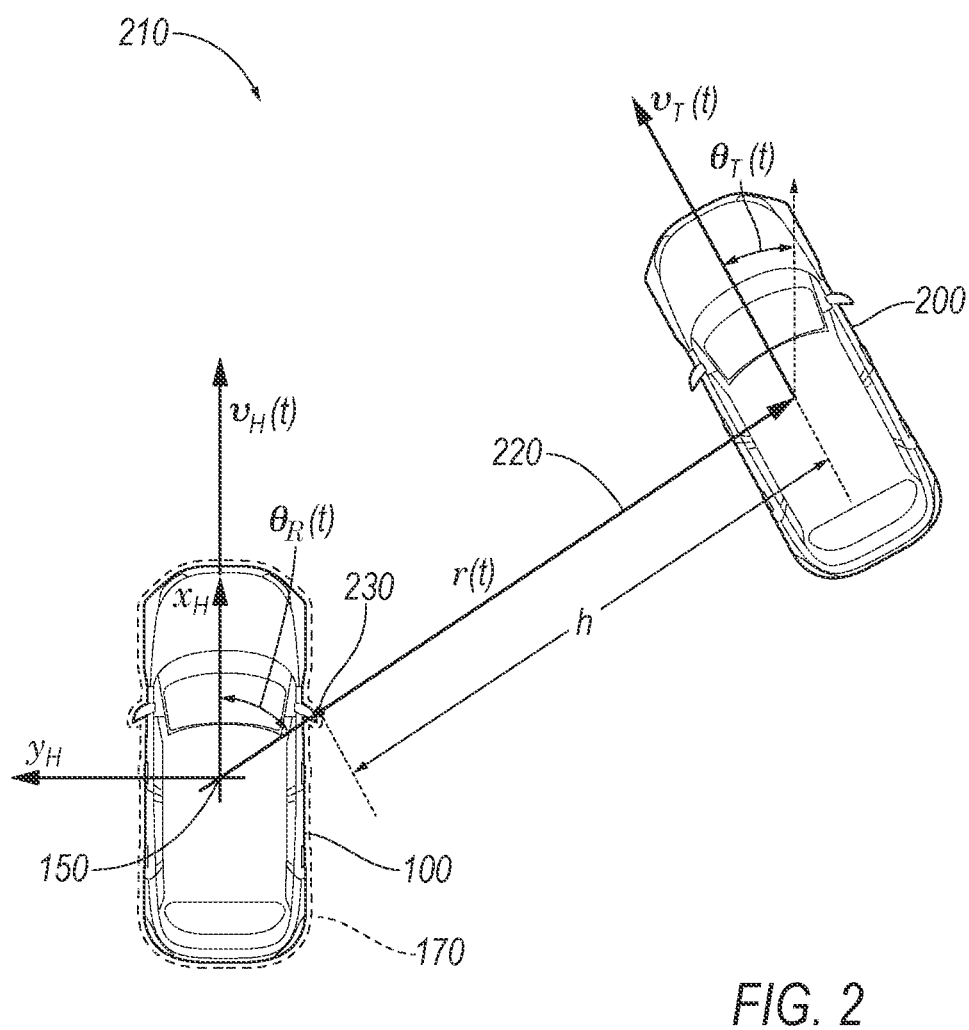
FIG. 2 is a diagram showing the vehicle of FIG. 1 and a target object.

FIG. 2 shows an example operating scenario of the vehicle 100 and a target object, or target 200, e.g., a second vehicle, a pedestrian, etc., within an area 210. An area 210, in the present context, means a portion of a ground surface, e.g., a two-dimensional (2D) area on the surface of the earth. Location coordinates of vehicle(s) 100, target(s) 200, etc., may be defined by global positioning system (GPS) coordinates. Boundaries or edges of an area 210, e.g., defined by connecting vertices of a triangular or rectangular area, specifying a radius from a center of a circular area, etc., may be specified by GPS coordinates. An area 210 may have any suitable dimensions and/or shape, e.g., rectangular, oval, circular, irregularly shaped, etc. An area 210 may include a section of a road, an intersection, etc. An area 210 may be defined by a detection range of a sensor 130, i.e., locations within a predetermined distance, e.g., 200 meters (m), from the sensor 130.

In addition to a vehicle 100, target(s) 200 such as other vehicles, pedestrians, bicycles, etc. may be present in the area. The locations of the vehicle 100 and the target(s) 200 may be specified in a two-dimensional Cartesian coordinate system 240, e.g., having X, Y axes, as shown in FIG. 2. For example, the location coordinates of the vehicle 100 and/or the targets 200 may be defined according to one or more of GPS location coordinates, a coordinate system defined with respect to the vehicle 100, e.g., the reference point 150, a coordinate system defined for a locale or area in which the vehicle 100 is operating, etc.

The computer 110 may navigate the vehicle 100, e.g., based on data received from the HMI 140. For example, the received data may include GPS location coordinates of a destination specified according to user input.

A vehicle 100 can operate on a roadway by determining a path polynomial to traverse a vehicle path. A computer 110 can determine a path polynomial including path coefficients based on vehicle 100 sensor data and/or data received from a remote computer, etc. In the present context, a path is a straight and/or curved line that describes successive locations (i.e., locations at different times) of an object, e.g., a vehicle 100, a target 200, etc., on a two-dimensional (2D) plane parallel to the surface of a roadway upon which the object moves.

The computer 110 may be programmed to actuate vehicle 100 actuators 120, e.g., propulsion, braking, and/or steering actuators 120. In one example, the computer 110 may actuate the vehicle 100 actuators 120 based on input received from a vehicle 100 operator via a vehicle HMI 140, e.g., brake pedal, steering wheel, gas pedal, etc. Additionally or alternatively, the computer 110 may be programmed to operate the vehicle 100 in an autonomous mode by actuating vehicle 100 actuators 120 to navigate the vehicle 100 to a destination while avoiding a collision with other target(s) 200 within the area 210. The vehicle 100 computer 110 can be programmed to determine an acceleration command $u_p$ and a steering command δp for the vehicle 100 based on the vehicle 100 destination and sensor 130 data. The computer 110 may be programmed to actuate propulsion and/or braking actuator(S) 120 based on the determined acceleration command $u_p$ and actuate a steering actuator 120 based on the determined steering command δp.

As disclosed herein, a vehicle computer 110 can detect a road surface, i.e., characteristics or attributes of a ground surface on which a vehicle 100 is operating. and can then, based on the detected road surface, intervene in vehicle 100 operation of propulsion, steering, and/or braking. For example, the vehicle computer 110 could override a vehicle 100 operator input and/or a command generating by a virtual driver program or the like, i.e., a command generated in a vehicle computer 110 to control the vehicle 100 based at least in part on data from one or more vehicle sensors 130. For example, a vehicle 100 computer 110 can be programmed to determine a virtual boundary 170 for a vehicle 100 body 160 based on a shape of the vehicle 100 body 160, to identify target(s) 200 based on vehicle sensor data, based on the detected target(s) 200, the determined virtual boundary 170, and an input to at least one of propulsion, steering, or braking, determine at least one of a braking override, acceleration override, or a steering override, and based on the determination, perform at least one of adjusting a vehicle 100 steering and a vehicle 100 speed.

In the present context, a steering override $\bar{\delta}$, and an acceleration override $\bar{u}$ are respective commands to deviate from a steering command δp or acceleration command $u_p$ determined based on user input and/or by a vehicle computer 110. Acceleration override $\bar{u}$ may be an array including propulsion override and braking override.

Figure 3:
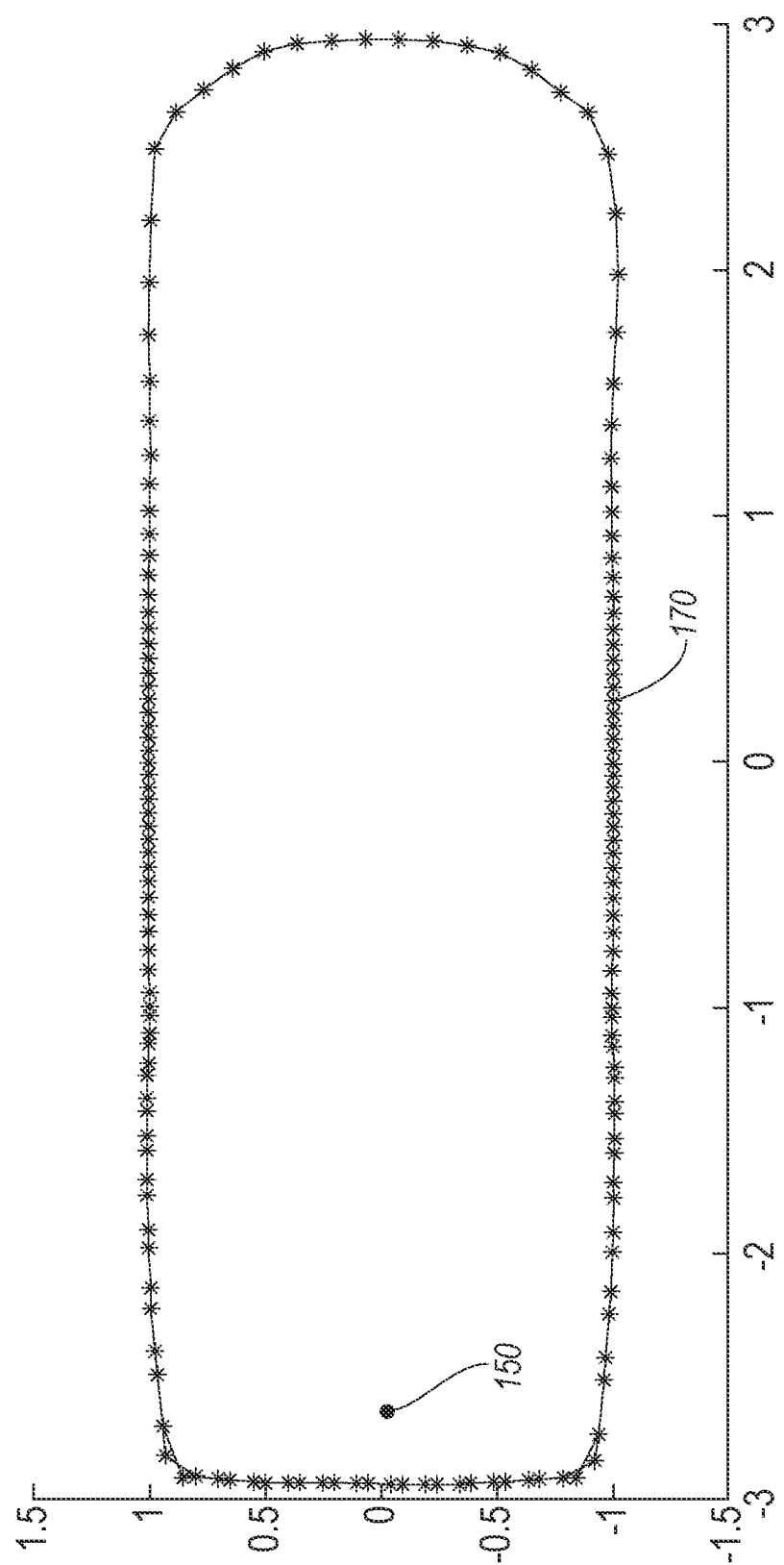
FIG. 3 is a diagram showing another example of a virtual boundary of the vehicle of FIG. 1.

FIG. 3 shows another example of a virtual boundary 170 for the vehicle 100 defined as an area on a ground surface around the vehicle 100, e.g., defined based on an exterior shape of the vehicle 100 in a horizontal plane. Typically the virtual boundary 170 is defined as a projection of the vehicle 100 body 160 on the ground surface including accessories such as exterior mirrors, bumpers, etc., which may be at different heights (i.e., distances from a ground surface). That is, a top-down view of an outline of a vehicle 100 body 160 could be projected onto a ground surface to define a 2D virtual boundary 170. Thus, a virtual boundary 170 defines an area around the vehicle 100 enclosing the body 160 of the vehicle 100. An area of a virtual boundary 170 can be mathematically specified as $\{(r, \theta_R) \in [0, \infty) \times [0, 2\pi) | r \leq \Gamma(\theta_R)\}$. In one example, each point on the virtual boundary 170 is defined to be spaced from a nearest point of the vehicle 100 body 160 by a specified distance, e.g., 10 centimeters (cm). With reference to Equation (1) and FIG. 2 below, the computer 110 may be programmed to specify the virtual boundary 170 by implementing a function $\Gamma(\theta_R)$ that determines a distance from the reference point 150 within the virtual boundary to a point 230 on the virtual boundary at an angle $\theta_R$ angle between a virtual line 220 and reference line $x_h$. In other words, the function $\Gamma(\theta_R)$ can specify various shapes of virtual boundaries as the distance of a point 230 on the virtual boundary 170 and the angle $\theta_R$ vary. The virtual line 220 is an imaginary line extending from the vehicle 100, e.g., a reference point 150, to a target 200.

The computer 110 may be programmed to operate based on a control barrier function (as discussed below with respect to Expressions (2)-(4)) that determines a barrier distance h along a virtual line 220 extending from the vehicle 100, e.g., a reference point 150, to a target 200. The relative distance h is defined as a distance (or length) along the line 220 from a point 230 on the virtual boundary 170 at respective orientations of a virtual line 220 to the target 200. The point 230 is at an intersection of the virtual line 220 with the virtual boundary 170. A distance h is defined as a distance from the virtual boundary 170 of the vehicle 100 to a target 200. Additionally or alternatively, as discussed below, h may represent a relative motion between the vehicle 100 and a target 200 taking into account various physical parameters such as relative distance, relative acceleration, relative speed between the vehicle 100 and the target 200. When other physical parameters. such as speed or acceleration. are taken into account, a visualization of distance h and boundary 170 may need to include a third dimension z (not shown). Alternatively, level sets may be used to illustrate the boundary in the plane. A level-set is an embedding of a higher-dimensional geometric object into a lower-dimensional subspace by fixing one of the independent variables. Examples include visualizing horizontal cut-outs of 3D geometric objects. For example, dimensions of the boundary around the vehicle 100 may either increase or decrease in size depending on a sign of the relative velocity of the vehicle 100 and target 200. For example, if the relative velocity is negative (indicating the vehicle 100 is approaching the target 200), then the virtual boundary 170 would be enlarged. Alternatively, if the relative velocity is positive, the virtual boundary 170 may shrink in size. Lines $x_h$, $y_h$ illustrated in FIG. 2 are axes of a coordinate system defined with respect to the vehicle 100, i.e., a Cartesian coordinate system having an origin at the reference point 150. Parameters r, $\Gamma$, $v_H$, $v_T$, $\theta_R$, $\theta_T$, represent, respectively, (i) a distance between the target 200 and the virtual boundary reference point 150, (ii) a distance of the virtual boundary 170 from the point 230 and the reference point 150, (iii) a velocity vector of the vehicle 100, (iv) a velocity vector (i.e., a vector specifying a direction and magnitude of speed) of the target 200, (v) an angle between the virtual line 220 and reference line $x_h$, and (vi) an angle between the velocity vector $v_T$ of the target 200 and the reference line $x_h$. Expression 1 below thus illustrates a mathematical function for determining the relative distance h.

$$h(r, \theta_R, \theta_T, v_H, v_T) = r - \Gamma(\theta_R) \quad (1)$$

A Control Barrier Function, herein, is an expression, i.e., a mathematical relationship, such as Expressions (2)-(4), which define a constraint to be satisfied. A Control Barrier Function (CBF) is a barrier function where for every state $x(t) \in X$, there exists a control input $u(t) \in U$ such that (2) is true. Note that defining a control barrier is based on a mathematical model for a system, e.g., $\dot{x} = f(x) + g(x)u$ to specify a state of a system including the vehicle 100 and the target 200. Thus, Expression (1) defines the CBF, Expression (2) may be used to define a set of x that satisfy the CBF, and Expression (3) defines a dynamic constraint to be enforced via a control input u. With reference to Expression (2) below, the computer 110 may be programmed to operate the vehicle 100 such that the barrier function h(x) is greater than or equal 0 (zero), i.e., avoiding that a target 20 enters the virtual boundary 170. x(t) represents a location of the vehicle 100 at a time t. The time t is a time at which the vehicle 100 is operated using control barrier function to avoid the target 200 entering the virtual boundary 170 of the vehicle 100.

$$h(x(t)) \geq 0 \quad (2)$$

The computer 110 may determine the propulsion and/or braking override $\bar{u}$ by performing an optimization operation on a control barrier function (e.g., as shown in example Expressions (2), (3), or (4) including a relative distance function h and a derivative of the relative distance function $\dot{h}$. With reference to Expression (3), which specifies a constraint providing an improved approach to avoid a target 200 entering the virtual boundary 200, the computer 110 may be programmed to determine the derivative of the distance function based on a derivative of a distance of a virtual line 220 extending from the virtual boundary 170 to the one or more targets 200 and a derivative of the orientation of the virtual line 220 relative to a virtual reference line $x_H$ Expression (3) further depends on a control input u(t), e.g., actuation of steering and acceleration of the vehicle 100. Thus, control function u(t) or a range for the control function u(t) may be identified which satisfies the Expression (3). A function $\dot{h}((x(t), u(0))$ is a temporal derivative of function h based on a state vector x(t) of the vehicle 100 and the control or input vector u(t).

$$\dot{h}((x(t), u(0)) + \lambda h(x(t)) \geq 0 \quad (3)$$

In some examples, to compensate for uncertainty, a margin for the uncertainty may be built into the control barrier function, e.g., as shown in Expression (4). Uncertainty is a measure of potential inaccuracy, i.e., specifies a level of expected precision or accuracy, in data from sensors 130. For example, there may be uncertainty in determining the relative distance or relative motion h based on data received from the sensors 130. For example, an object detection sensor 130 determining a distance from a target 200 may have in the inaccuracy of 1 meter.

$$\dot{h}((x(t), u(0)) + \lambda h(x(t) - \varepsilon) \geq 0 \quad (4)$$

Equations (5)-(6b), shows other examples of defining relative motion h and a derivative of relative motion $\dot{h}$. Function $\gamma$ is a spatial gradient with respect to a relative heading angle of the vehicle 100, as shown in Expression (6b).

$$h(r, \theta_R, \dot{r}) = r - \Gamma(\theta_R) \tag{5}$$

$$\dot{h}(r, \theta_R) = \dot{r} - \gamma(\theta_R)\dot{\theta}_R \tag{6a}$$

$$\gamma(\theta_R) := \frac{\partial}{\partial \theta_R} \Gamma(\theta_R) \tag{6b}$$

The computer 110 may be programmed to determine (i) an override of propulsion, (ii) a combination of overriding propulsion and steering, (ii) an override of steering only, (iii) an override of steering and an override of braking, or any other combination of overriding propulsion, steering, and braking. The computer 110 may be programmed to determine steering override $\bar{\delta}$ and acceleration override $\bar{u}$ using an optimization technique, e.g., Quadratic Programming. Quadratic programming (QP) is a type of non-linear programming for solving mathematical optimization problems involving quadratic functions; QP can be used to optimize (minimize or maximize) a multivariate quadratic function subject to linear constraints on the variables. For example, the computer 110 may be programmed to identify optimized minimum overrides $\bar{\delta}$, $\bar{u}$ for Expression (3) based on min operation (7). Operation (7) returns minimum values for overrides $\bar{\delta}$, $\bar{u}$ based on, e.g., Expression (3). Thus, based on solving the optimization problem expressed in Expression (7) subject to the constraint given in (3), only certain combinations of steering/braking will be satisfying Expression (3). Based on the result of optimization, then, a minimum "amount" of steering/braking is taken to actuate the vehicle 100 actuators 120. The computer 110 may be programmed to determine adjusted actuation commands based on the planned values and override values. For example, with reference to Equation (8), the computer 110 may be programmed to determine an adjusted steering actuation $\delta_{adj}$ based on the determined steering actuation $\delta_p$ (e.g., determined by a human operator or an autonomous vehicle control system) and the determined steering override $\bar{\delta}$. With reference to Equation (9), the computer 110 may be programmed to determine an adjusted acceleration actuation $u_{adj}$ based on the determined acceleration actuation $u_p$ (e.g., determined by human operator or autonomous vehicle control system) and the determined acceleration override $\bar{u}$.

$$\min[\bar{\delta}\ \bar{u}]H\begin{bmatrix}\bar{\delta}\\\bar{u}\end{bmatrix} \tag{7}$$

$$\delta_{adj} = \delta_p + \bar{\delta} \tag{8}$$

$$u_{adj} = u_p + \bar{u} \tag{9}$$

The technique disclosed herein can simultaneously be applied to more than one target 200. Expression (10) specifies a first barrier function $h_1$ for a first target 200 and Expression (11) specifies a second barrier function $h_2$ for a second target 200. The computer 110 may be programmed to identify overrides $\bar{\delta}$, $\bar{u}$ while simultaneously satisfying the Expressions (10)-(11).

$$\dot{h}_1((x(t),u(t)) + \lambda h_1(x(t)) \geq 0 \tag{10}$$

$$\dot{h}_2((x(t),u(t)) + \lambda h_2(x(t)) \geq 0 \tag{11}$$

Based on, e.g., physical characteristics of vehicle 100 actuators 120, road conditions, etc., maximum allowed acceleration, deceleration, and/or steering actuation limits may be specified. For example, a maximum braking deceleration may be determined based on braking actuator 120 characteristics, e.g., a friction coefficient of brake pads, a vehicle 100 weight, a vehicle 100 aerodynamic resistance, etc., and/or a road condition, e.g., a coefficient of friction, rain, snow, ice, etc. Equations (12)-(13) show examples of the relative motion function h that further includes maximum allowed deceleration. The operator "sgn" is a function returning 1 (one) for positive input, −1 (minus one) for negative input and 0 (zero) for a 0 (zero) input. A maximum acceleration is computed defined as d in the denominator of Expression (12). When vehicle 100 is heading straight toward the target 200, and can only use deceleration, the value of the function h will be negative if more deceleration is needed than the amount given by d. This is found via kinematic expressions for constant deceleration, i.e. if an initial relative velocity and distance from the target 200 are known, then a constant deceleration will result in a fixed amount of distance traveled. If the actual distance is less than the distance needed, then the vehicle 100 may hit the target 200. The function h is then positive if there is enough distance to stop assuming maximum deceleration. Additionally or alternatively, an additional constraint such as $|\delta_{adj}| \leq \delta_{max}$ may be added to Expressions (10)-(11).

$$h(r, \theta_R, \dot{r}) = r - \Gamma(\theta_R) + \text{sgn}(\dot{r})\frac{\dot{r}^2}{2d} \tag{12}$$

$$\dot{h}(r, \theta_R) = \dot{r} - \gamma(\theta_R)\dot{\theta}_R + \text{sgn}(\dot{r})\frac{\dot{r}}{d}\ddot{r} \tag{13}$$

Similarly, a minimum steering distance margin or a "last point to steer" may be determined based on steering actuator 120 characteristics, e.g., a maximum road wheel angle or a maximum lateral acceleration that can be attained by the tires at a given speed which can be a function of a road condition e.g., a coefficient of friction, rain, snow, ice, etc., and a minimum lateral offset needed to evade a target 200. Equation (13a) shows an example of the relative motion function h that further includes maximum allowed lateral acceleration. $a_{y,max}$ is a maximum lateral acceleration. A necessary lateral clearance $s_y$ is calculated based on vehicle 100 geometry and the position of the target 200 relative to the vehicle 100. This is found via kinematic expressions for constant steering at a constant relative velocity, that is, if an initial relative velocity and a lateral displacement from the target 200 is known, then a constant lateral acceleration will result in a fixed amount of lateral distance traveled in a given longitudinal distance. If the actual longitudinal distance is less than the longitudinal distance required to clear the target 200, then the vehicle 100 may hit the target 200. The function h is then positive if there is enough distance to clear the target 200 assuming maximum lateral acceleration.

$$h(r, \theta_R, \dot{r}) = r - \Gamma(\theta_R) + \sqrt{\frac{2s_y}{a_{y,max}}}\dot{r} \tag{13a}$$

Figure 4:
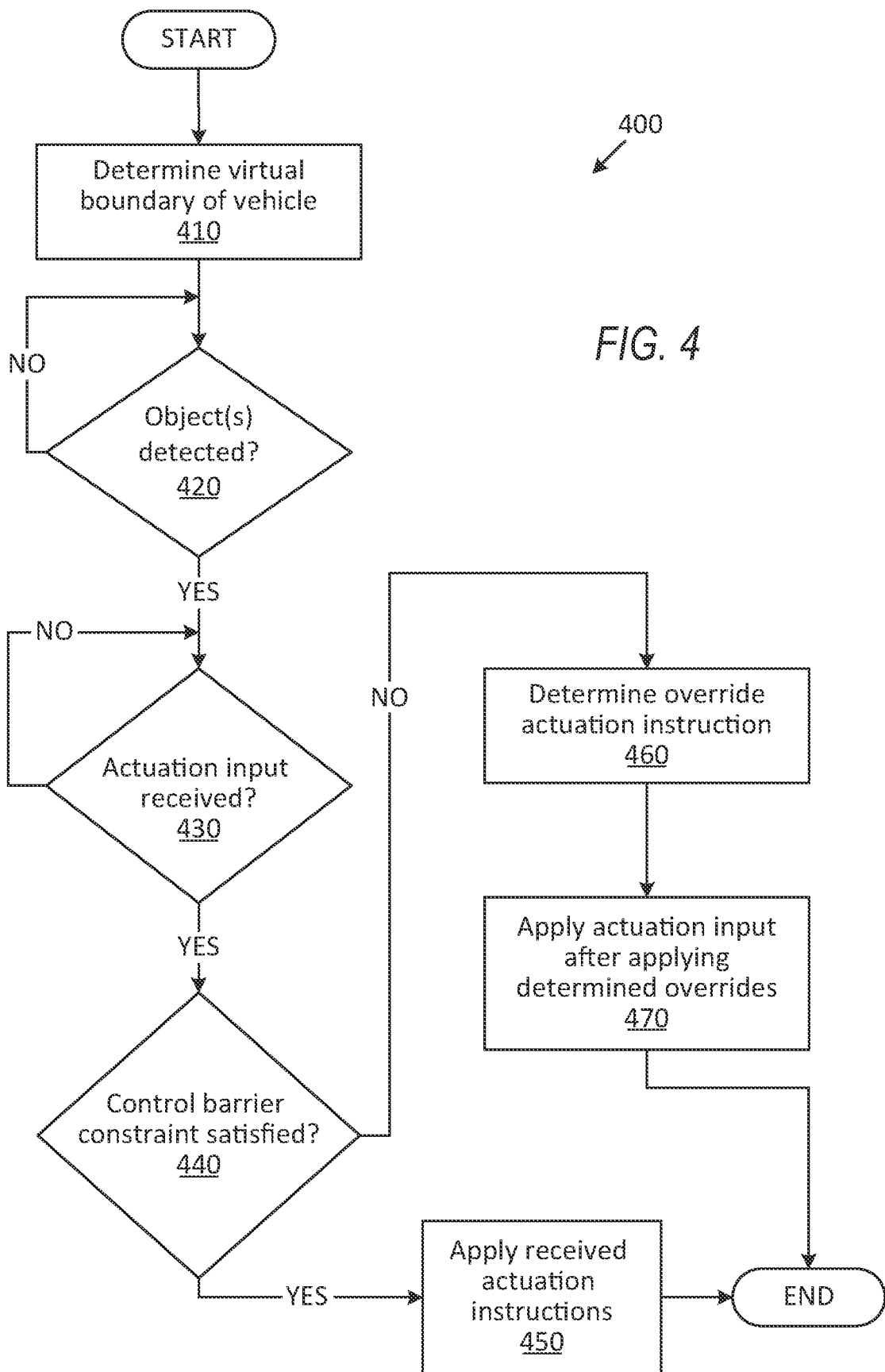
FIG. 4 is a flowchart of an exemplary process for navigating a vehicle.

FIG. 4 is a flowchart of an example process 400 for controlling vehicle 100 operation. The computer 110 may be programmed to execute blocks of the process 400.

The process 400 begins in a block 410, in which the computer 110 determines or receives a predetermined virtual boundary 170 of the vehicle 100. For example, as discussed with respect to FIG. 2, the computer 110 may be programmed to determine and store a function $\Gamma(\theta_R)$ that returns a distance from a reference point 150 of the virtual boundary 170 to a point on the virtual boundary 170 for each given angle specified location $\theta_R$. Alternatively, the computer 110 may store, and/or receive from a remote computer, a default virtual boundary 170 definitions Next, in a decision block 420, the computer 110 determines whether one or more targets 200, e.g., other vehicles, pedestrians, buildings, vegetation, etc., is or are detected. The computer 110 may be programmed to identify a target 200 based on data received from a vehicle 100 sensor 130, a remote computer, etc., according to any suitable means. If the computer 110 determines that one or more targets 200 are detected, then the process 400 proceeds to a decision block 430; otherwise the process 400 returns to the decision block 420.

In the decision block 430, the computer 110 determines whether an actuation input is received. The computer 110 may be programmed to an actuation input from a human operator, e.g., via HMI 140, and/or from an autonomous vehicle control system, e.g., a second program stored in the computer 110 memory, an FPGA communicating with the computer 110 via a vehicle 100 network, etc. For example, actuation inputs may include acceleration or deceleration actuation $u_p$ and/or steering actuation $\delta_p$. If the computer 110 determines that actuation input is received, then the process 400 proceeds to a decision block 440; otherwise the process 400 returns to the decision block 430.

In the decision block 440, the computer 110 determines whether a control barrier function, e.g., as specified in Expression (3), is satisfied. In another example, if more than one target 200 is identified, the computer 110 may be programmed to determine whether each of the respective barrier functions, e.g., as shown in Expressions (10)-(11) are satisfied. If the barrier function(s) associated with detected target(s) 200 are satisfied, then the process 400 proceeds to a block 450; otherwise the process 400 proceeds to a block 460.

In the block 450, the computer 110 applies the received actuation inputs of the block 430. Following the block 450, the process 400 ends, or alternatively returns to the block 410, although not shown in FIG. 1.

In the block 460, the computer 110 determines one or both of actuation overrides $\bar{\delta}$, $\bar{u}$. The computer 110 may be programmed to perform an optimization technique to identify propulsion or braking override $\bar{u}$, and/or steering override $\bar{\delta}$ based on a respective Expression (3). In another example, when multiple targets 200 are identified, the computer 110 may identify override actuation $\bar{\delta}$, $\bar{u}$ while satisfying multiple Expressions, e.g., Expressions (10)-(11).

Next, in a block 470, the computer 110 applies adjusted actuation commands $\delta_{adj}$, $u_{adj}$ to the vehicle 100 actuators 120. The computer 110 may be programmed, based on Equations (8)-(9), to determine the adjusted actuation commands $\delta_{adj}$, $u_{adj}$ based on the received actuation input $\delta_p$, $u_p$, and the determined overrides $\bar{\delta}$, $\bar{u}$. Following the block 470, the process 400 ends, or alternatively returns to the block 410, although not shown in FIG. 1.

Figure 5A:
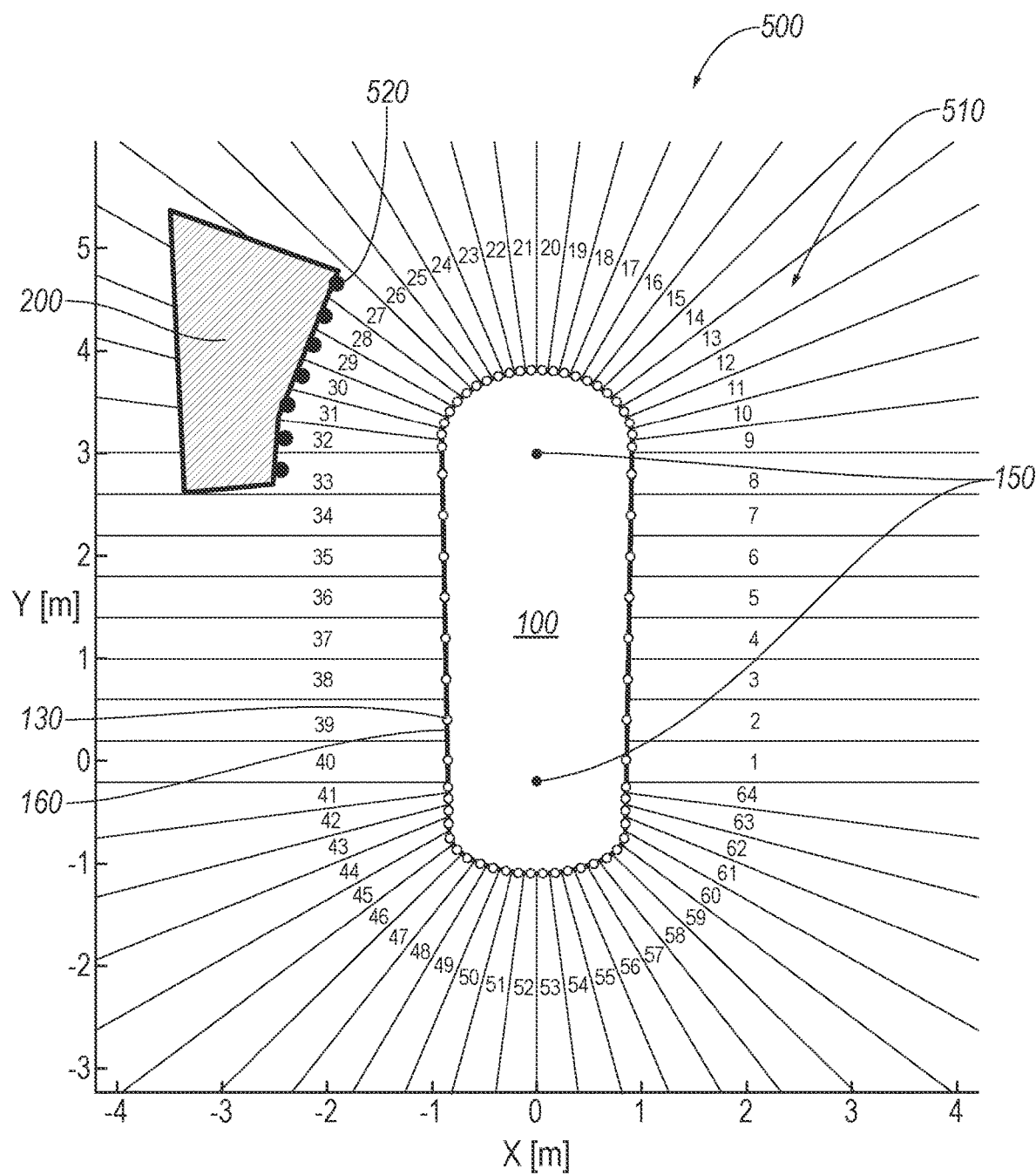
FIG. 5A is a diagram showing example sensor radial zones around the vehicle of FIG. 1.

FIG. 5A is an example diagram 500 illustrating the vehicle 100 with reference points 150. Multiple radial zones 510, e.g., zones 1 to 64 as seen in FIG. 5A, can be defined that extend from the perimeter 160 of the vehicle 100. A zone is an area or volume above the ground surface with a bottom on the ground surface which is shaped like a trapezoid, rectangle, a sector of a circle, or any area bounded by a section of the vehicle 100 virtual boundary 170, two line sections extending from the vehicle 100 virtual boundary 170 having each a first end point on the virtual boundary 170 and second points that are connected with a third line section. Radial zones are defined according to the position and detection range of sensors 130 around the vehicle 100, e.g., a height of a trapezoid may represent a detection range of the sensor 130.

Figure 5B:
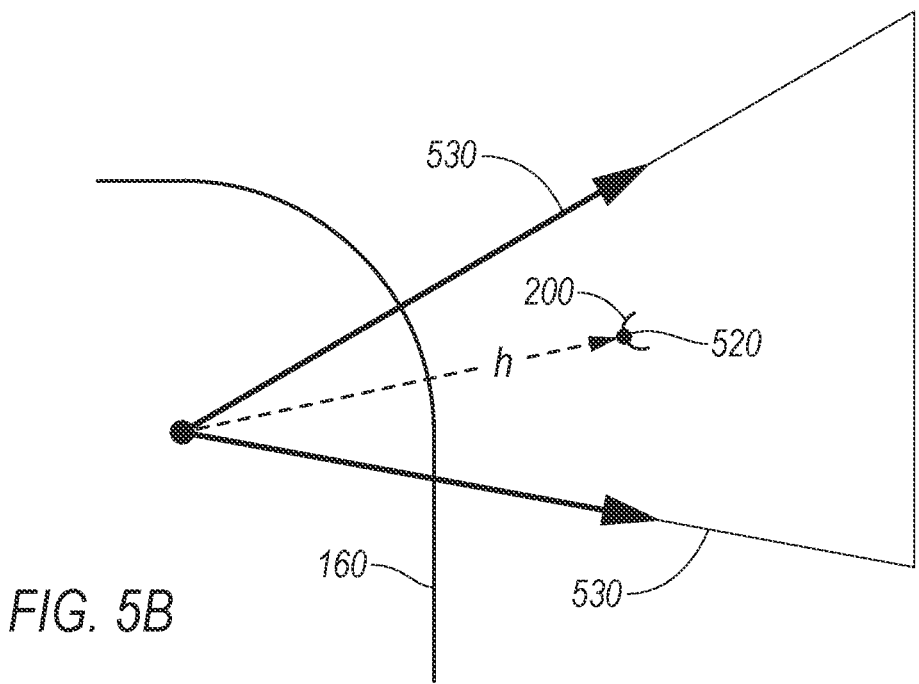
FIG. 5B is a diagram showing an example radial zone.
Figure 5C:
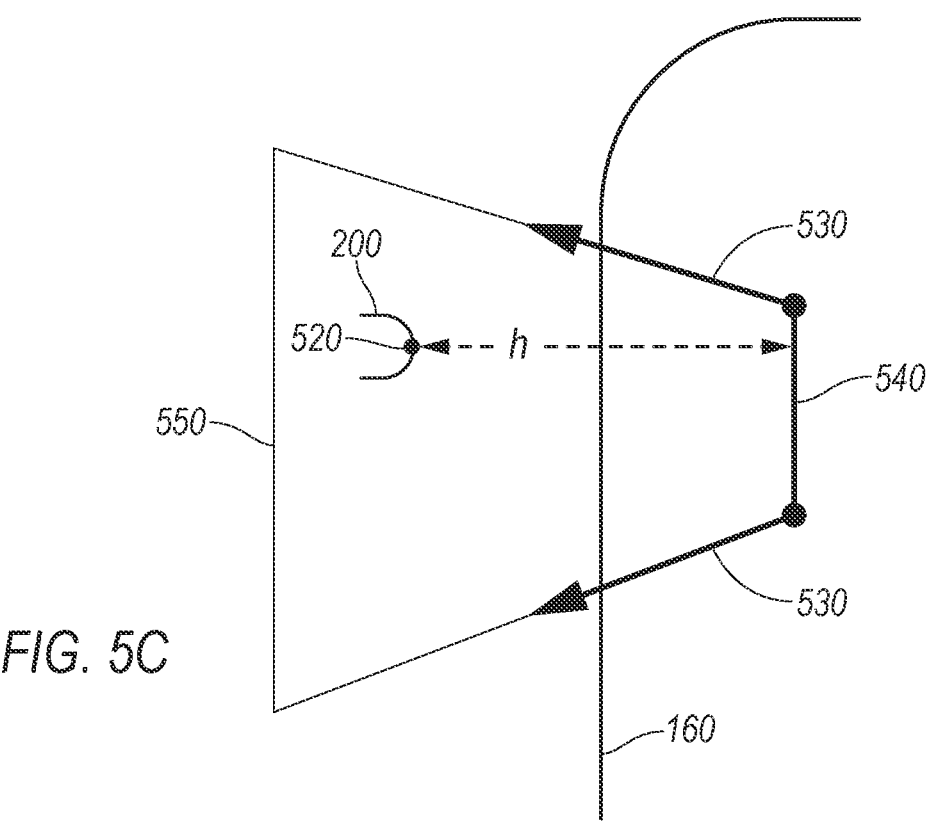
FIG. 5C is a diagram showing another example radial zone.

FIGS. 5B-5C illustrate example radial zones with different shapes. FIG. 5B shows an example triangular-shaped radial zone with the first and second line sections 530 extending away from the vehicle 100. The computer 110 may determine a Euclidian distance h between a vehicle 100 point and a point 520 on an object 200. A Euclidian distance between two points is a length of a line segment between the two points. It can be calculated from the Cartesian coordinates of the points, e.g., using the Pythagorean theorem.

FIG. 5C shows an example trapezoidal-shaped radial zone. The trapezoidal-shaped radial zone has a short base 540, a long base 550, and two legs 530 extending away from the vehicle 100. The short base 530 is within the virtual boundary 160, whereas the long base 550 is outside the virtual boundary 160. The long base 550 of the radial zone may represent an end of a detection range of the vehicle 100 sensor 130 providing sensor data from the respective radial zone. The computer 110 may be programmed to determine a distance h of an object 200 from the short base 530 of the radial zone. In one example, the computer 110 may detect a point 520 on the object 200 and determine a distance h of the point 520 from the short base 530 of the radial zone. Additionally or alternatively, a radial zone may have other shapes. For example, the long base 550 may have a curved shape. The radial zone may be 2D as shown in FIGS. 5A-5C or a volume having (i) a base as shown in FIGS. 5A-5C on the ground surface and (ii) a height, e.g., 2 meters from the ground surface.

The computer 110 may be programmed to receive data from sensors 130 and to determine whether an object 200 is detected in a radial zone. For example, with reference to FIG. 5A, the computer 110 may detect an object 200 in zones 27-33 by detecting a point 520 on the object 200 surface, e.g., on an edge of an object 200 body. The computer 110 may be programmed to determine a distance h from the vehicle 100 boundary 170 to the point 520 on the object 200. Thus, the computer 110 110 may be programmed to determine a distance $h_i$ for an $i^{th}$ zone from the vehicle 100 virtual boundary 170 to the object 200.

In one example, the vehicle 100 may include a sensor 130 for each radial zone, whereas, in some other examples, some sensors 130 may provide data encompassing multiple radial zones 510. An object 200 may be static or moving relative to the ground surface. In the present context, an object 200 is considered static upon determining that a speed of the object 200 is less than a speed threshold, e.g., 1 kilometer per hour (kph). Accordingly, an object 200 is considered dynamic (or moving) when a speed of the object 200 relative to the ground surface is greater than the speed threshold, e.g., 1 kph.

With continued reference to FIG. 5A, the computer 110 can be programmed to determine a virtual boundary 170 for a vehicle 100 body 160 based on a shape of the vehicle 100 body 160 (as discussed with reference to FIGS. 2-3), and upon identifying an object 200, to identify points 520 on the object 200 based on received sensor 130 data. The computer 110 can be programmed to determine a barrier function based on each of the identified points 520. The barrier function determines a barrier distance $h_i$ from the virtual boundary 170 of the vehicle 100 to a respective one of the points 520 on the object 200. The computer 110 can be further programmed, based on (i) the determined barrier functions, (ii) the determined virtual boundary 170 of the vehicle 100, and (iii) an input to at least one of propulsion, steering, or braking, to determine at least one of a braking override, a steering override, and/or a propulsion override, and based on the determination, adjust at least one of a vehicle steering or a vehicle speed.

The computer 110 may be programmed, e.g., based on the example barrier function shown in Equation (14), to determine a barrier distance $h_i$ from a point 520 of a static object 200 to the virtual boundary 170 of the vehicle 100. Table 1 shows the description of the parameters of Equation (14). Equation (14) shows only an example barrier function. Other barrier functions may be used, e.g., for a parameterized virtual boundary.

$$h_i = \frac{(x_{ti} - x)^2}{\alpha^2} + (y_{ti} - y)^2 - R_h^2; \alpha > 1 \tag{14}$$

TABLE 1

| Parameter | Description |
|---|---|
| i | Target object identifier |
| $x_{ti}$ | Longitudinal location of $i^{th}$ point on the object at time t |
| x | Longitudinal location of vehicle at time t |
| $y_{ti}$ | Lateral longitudinal location of $i^{th}$ point on the object at time t |
| y | Lateral location of vehicle |
| $R_h$ | Distance of virtual boundary of vehicle from a reference point of vehicle measured at a point on the virtual boundary that is on an imaginary line extending from the point on the object to the vehicle |
| α | Eccentricity of ellipse-shaped virtual boundary. |
| $h_i$ | Barrier distance of ith point of object from the vehicle |

The computer 110 may be programmed to operate the vehicle 100 such that Expression (15) and/or Expression (16) are satisfied. Expression (15) is an example first-order expression based on the barrier distance $h_i$. Expression (16) is an example second-order expression based on the barrier distance $h_i$. With reference to FIG. 5A, the computer 110 may be programmed to determine whether Equation (15) is satisfied for the points 520 on a static object 200, e.g., a wall, a parked vehicle.

$$\dot{h}_i + \lambda h_i \geq 0 \tag{15}$$

$$\ddot{h}_i + l_1 \dot{h}_i + l_0 h_i \geq 0 \tag{16}$$

The computer 110 may be programmed to determine a plurality of radial zones 510 extending from the virtual boundary 170, and upon determining that the object 200 is a static object 200, identify the points 520 on the static object 200 based on received virtual sensor 130 data from the radial zones 510. To determine whether the detected object 200 is static, the computer 110 may determine tracking data of the detected object 200, e.g., speed, location, etc., of the object 200 and determine based on the determined tracking data and the host vehicle 100 speed, the direction of movement, etc., whether the relative speed of the object 200 exceeds a threshold, e.g., 1 kph. Tracking data, in the present context, can include data specifying an object, e.g., by identifier number, dimensions, type, etc., and corresponding variable parameters such as speed, acceleration, location, direction, etc. In one example, the computer 110 may determine relative speed, location, etc., of the object 200 with respect to the vehicle 100 and then determine the speed, location, etc., of the object 200 relative to the environment, e.g., ground surface, further based on the speed, location, etc., of the vehicle 100.

The computer 110 may be programmed to determine at least one of a braking override, a propulsion override, or a steering override by solving an optimization problem to identify a set of actuation of one or more vehicle 100 actuators 120 that satisfy the barrier functions, e.g., Expression (15)-(16).

To determine ego-motion of the host vehicle 100 (track host vehicle 100 location, speed, heading, etc.), the computer 110 may be programmed, based on a model such as a Kinematic Bicycle Model to determine a state (location, speed, heading, etc.) of the host vehicle 100. Kinematic Bicycle Model is a mathematical model to determine and track a state of a moving vehicle, e.g., a vehicle, a bicycle, etc., in a state space. Equations (17)-(20) specify an example implementation of a bicycle model for the host vehicle 100 movements. Table 2 shows descriptions of parameters included in Equations (17)-(20).

$$\dot{x}_r = v_r \cos\theta \tag{17}$$

$$\dot{y}_r = v_r \sin\theta \tag{18}$$

$$\dot{\theta}_r = \frac{v_r}{L}\tan(\delta) \tag{19}$$

$$\dot{V}_r = gu_{accel} \tag{20}$$

TABLE 2

| Parameter | Description |
|---|---|
| v | Vehicle speed |
| θ | Angle specifying a direction of vehicle movement, e.g., angle between vehicle longitudinal axis and X axis of the coordinate system |
| δ | Angle specifying a direction of vehicle wheels, e.g., angle between wheels direction (a projection of a plane of the wheel on the ground surface) and X axis of the coordinate system |
| $V_r$ | Velocity of the rear axle center of host vehicle |
| g | Gravitational constant to convert between units of acceleration and "g" force, approx. 9.8 m/s² |
| $u_{accel}$ | Host acceleration input |

The computer 110 may be programmed to generate tracking data for the identified object and determine based on the generated tracking data whether the identified object is a static object 200. For example, the computer 110 may be programmed to determine that an object 200 is static upon determining that a speed of the object 200 (e.g., specified based on object 200 longitudinal and lateral speeds) is less than a threshold, e.g., 1 kph.

Figure 6:
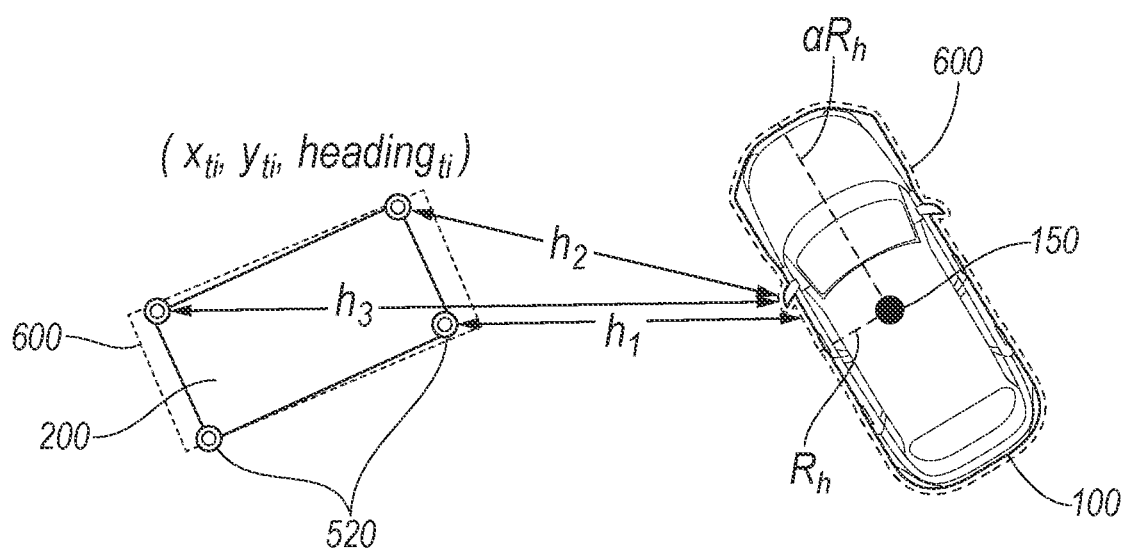
FIG. 6 is a diagram showing the vehicle and a detected object.

With reference to FIG. 6, the computer 110 may be programmed upon determining that the object 200 is a moving object 200, e.g., by determining that a speed of the object 200 exceeds a threshold, to generate tracking data such as location, speed, etc., for the points 520 on the identified moving object 200. The computer 110 may be programmed to determine parameters such as a speed, heading, location, etc., of each of the identified points 520 of the moving object 200 based on the vehicle 100 sensor 130 data, and to determine the barrier function further based on the determined parameters of each of the identified plurality of points 520.

With reference to FIG. 6, the computer 110 may calculate the barrier distances $h_i$ for 3 edges of a moving object 200, e.g., another vehicle, and can determine whether Expression (15) and/or Expression (16) are satisfied for each of the barrier distances $h_1$, $h_2$, $h_3$. As another example, distances $h_1$, $h_2$, $h_3$, $h_4$ may be determined respectively for four corners of the object 200. Equations (21)-(22) specify an integrator model for tracking an object 200. Additionally or alternatively, another model such as a bicycle model may be used, e.g., upon determining the target 200 to a bicycle. Table 3 shows an example list of tracking data that are determined for a tracked object 200.

$$\dot{x}_t = v_{tx} \quad (21)$$

$$\dot{y}_t = v_{ty} \quad (22)$$

TABLE 3

| Parameter | Description |
|---|---|
| $x_t$ | Longitudinal location of object at time t |
| $y_t$ | Lateral location of object at time t |
| $v_{tx}$ | Longitudinal speed of object at time t |
| $v_{ty}$ | Lateral speed of object at time t |
| $a_x$ | Longitudinal acceleration of object |
| $a_y$ | Lateral acceleration of object |
| L | Length of object |
| W | Width of object |
| Type | Type of object, e.g., car, truck, pedestrian, animal, etc. |
| Age | Duration of observing an object, e.g., measured in seconds. |

As discussed above with reference to Equations (7)-(9), the computer 110 may be programmed to determine an override of braking, propulsion, and/or steering based on satisfying the barrier function. As discussed with reference to Expressions (15)-(16), the barrier functions are individually determined with respect to the points 520. Thus, with reference to FIG. 6, barrier functions are individually determined for the barrier distances $h_1$, $h_2$, $h_3$. The computer 110 may be programmed to determine a braking override and/or a steering override by solving an optimization problem to identify a set of actuations of one or more vehicle 100 actuators 120 that satisfy the barrier functions. In other words, the computer 110 optimizes the vehicle 100 actuation by determining the barrier distances $h_1$, $h_2$, $h_3$, and determining whether actuation of the vehicle 100 actuators 120 should be overridden so that the Expressions (15)-(16) are satisfied with respect to individual point 520. The points 520 may be points on edges or corners of an object 200. For example, for a vehicle object 200 on a left lane with respect to the vehicle 100 the points 520 may be on a front right corner, rear right corner, and rear left corner of the vehicle object 200 as being included in a field of view of a vehicle 100 sensor 130, e.g., forward-looking camera sensor 130 on a front windshield of the vehicle 100.

In some examples, the points 520 of an object 200 may be on a second virtual boundary 600 defined around the object 200. The computer 110 may be programmed to determine a second virtual boundary 600 for the identified object 200 based on the plurality of points 520 on the identified plurality of points 520. The second virtual boundary 600 may be determined based on data specifying dimensions and type of the object 600. The computer 110 may be programmed to receive from a vehicle 100 sensor 130 and/or a remote computer, identifying a type and/or dimensions of the identified object 200. Received data may specify a length, width, etc., of the object 200 and/or specify a type of the object 200, e.g., truck, car, etc., and the computer 110 determine the object 200 length, width, etc., based on the received type of the object 200. In one example, the computer 110 may be programmed to fit an ellipse, rectangle, or a non-geometrical shape around the points 520 of the object 200. In another example, the computer 110 may receive data from the remote computer that specifies a shape that is fitted around the object 200. In yet another example, the computer 110 may fit a 2D shape, e.g., ellipse, circle, rectangle, etc., around the object 200 based on the received dimensions of the object 200, e.g., using Spline interpolation technique. The computer 110 may implement an optimization technique that adjusts a size of a shape, e.g., a radius of a circle, an eccentricity of an ellipse, etc., until each point of the target 200 fits in the shape. In one example, the computer 110 may be programmed to fit an ellipse to a set of data by finding coefficients a, and b that minimize a linear least squares regression problem, e.g., $\|[a; b]^\wedge T * X - [1 \ldots 1]\|$.

In one example, the computer 110 may be programmed to determine a projection of the object 200 on a ground surface based on the identified points 520, and to determine the braking override and/or steering override further based on the determined projection of the object 200. The computer 110 may be programmed to detect a perimeter 160 of the object 200 by identifying points 520 on of the object 200 and then determine a projection of the object 200 by determining a projection of the perimeter of the object 200 on the ground surface. Thus, the projection of the object 200 is, in an example, a virtual boundary 600 of the object 200.

The computer 110 may be programmed to determine the braking override and/or the steering override by solving an optimization problem including the barrier functions, e.g., Expressions (7)-(9), one or more constraints including a maximum deceleration threshold, a maximum acceleration threshold, and/or a maximum steering angle. An amount of actuation of a vehicle 100 actuator 120, e.g., a maximum deceleration caused by a full brake, a maximum steering angle reached by actuating the vehicle 100 steering actuator 120, etc., is typically limited based on physical characteristics of the vehicle 100, road conditions, traffic rules, etc. Thus, the computer 110 may store the maximum deceleration threshold, maximum steering threshold, etc., and may determine the overrides, e.g., brake override, steering override, or propulsion override, further based on the stored maximum thresholds. In other words, the stored thresholds may be used as constraints when the optimization problems are solved to determine the override actuations.

Figure 7:
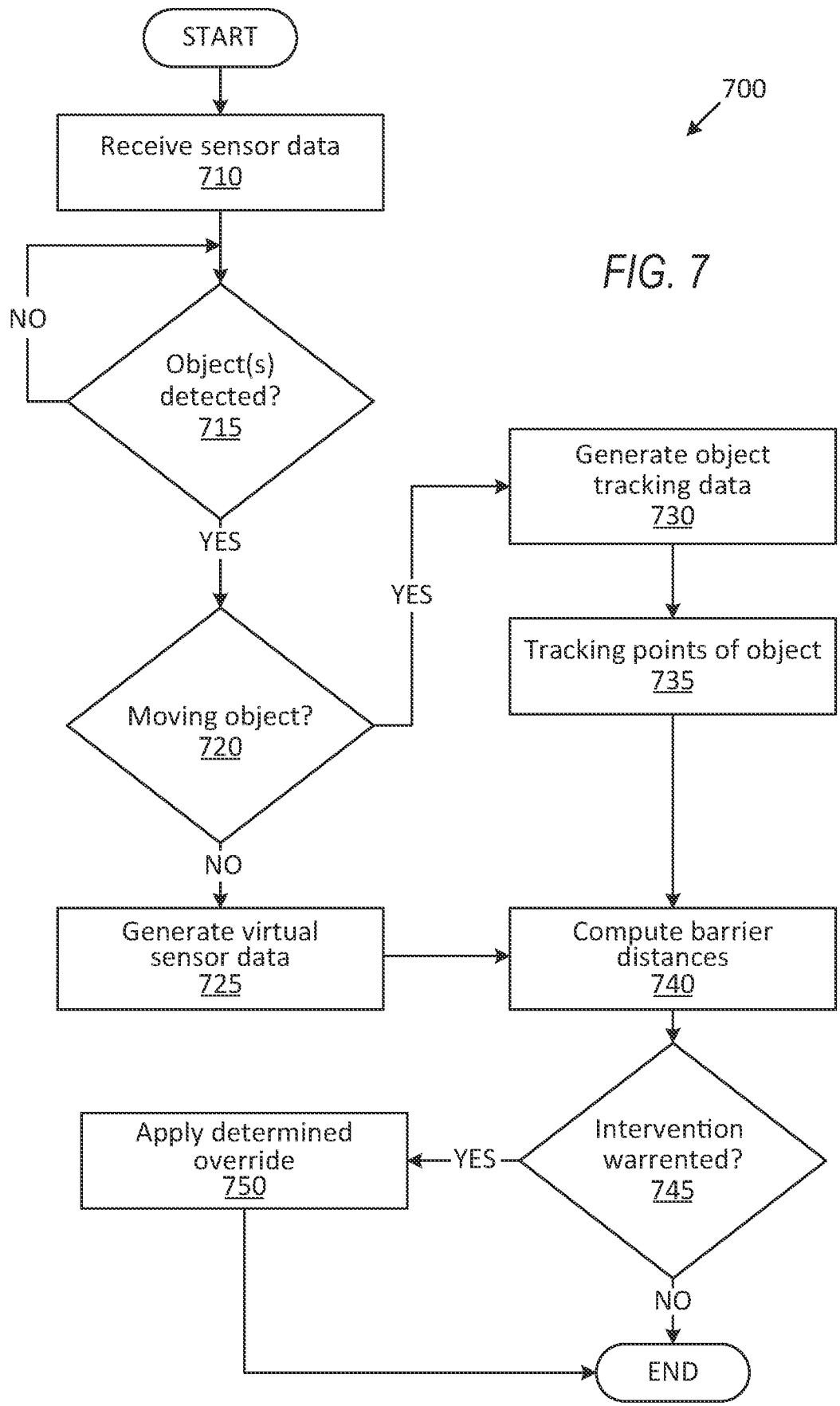
FIG. 7 is a flowchart of another exemplary process for navigating the vehicle.

FIG. 7 is a flowchart of an example process 700 for operating the vehicle 100. The computer 110 may be programmed to execute blocks of the process 700.

The process 700 begins in a block 710, in which the computer 110 receives sensor 130 data. The computer 110 may be programmed to receive data from object-detection sensors 130, e.g., camera sensor 130, radar sensor 130, lidar sensor 130. Additionally or alternatively, the computer 110 may be programmed to receive data from a remote computer, e.g., an infrastructure computer or a computer of a second vehicle, including data specifying object 200 data, e.g., location, dimensions, type, heading, etc.

Next, in a decision block 715, the computer 110 determines whether an object 200 is detected. The computer 110 may be programmed to detect an object 200 based on data received from the vehicle 100 sensors 130 and/or data received from a remote computer. If the computer 110 determines that an object 200 is detected, then the process 700 proceeds to a decision block 720; otherwise the process 700 returns to the decision block 715.

In the decision block 720, the computer 110 determines whether the detected object 200 is moving. The computer 110 may be programmed to determine that a detected object 200 is moving when a speed of the object 200 relative to the environment (i.e., a ground surface). The computer 110 may be programmed to determine a speed of the object 200 based on data received from a remote computer and/or based on tracking data of the object 200. If the computer 110 determines that the object 200 is moving, the process 700 proceeds to a block 730; otherwise the process 700 proceeds to a block 725.

In the block 730, the computer 110 generates object 200 tracking data. The generated object tracking data may include data such as included in example Table 3. The computer 110 may be programmed to generate the object 200 tracking data based on data received from the vehicle 100 sensors 130 and/or a remote computer.

Next, in a block 735, the computer 110 generates tracking data for various points 520 of the detected object 200. For example, the computer 110 may determine tracking data for edges of a detected vehicle object 200, e.g., front right, front left, rear right, rear left depending on whether included in a field of view of a vehicle 100 sensor 130.

Next, in a block 740, which can be reached from either of the blocks 725, 735, the computer 110 computers the barrier distances $h_i$. The computer 110 may be programmed, based on Equation (14), to compute a barrier distance $h_i$ from the vehicle 100 virtual boundary 170 to each of the points 520 of the object 200.

Next, in a decision block 745, the computer 110 determines whether an intervention in actuating vehicle 100 actuators 120 is warranted. The computer 110 may be programmed to determine whether Expressions (15)-(16) are satisfied and determine an override (i.e., an intervention) in actuating vehicle 100 actuators 120 is needed upon determining that the Expressions (15)-(16) cannot be satisfied without an override of braking, steering, and/or propulsion. If the computer 110 determines that an override is warranted, then the process 700 proceeds to a block 750; otherwise the process 700 ends, or alternatively returns to the block 710, although not shown in FIG. 7.

Computing devices as discussed herein generally each includes commands executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system for detecting a road surface, comprising a processor and a memory, the memory storing instructions executable by the processor to:
   determine a virtual boundary for a vehicle body based on a shape of the vehicle body;
   upon identifying an object, identify a plurality of points on the object based on received sensor data;
   determine a barrier function based on each of the identified plurality of points, wherein the barrier function includes a barrier distance from a reference point of the virtual boundary of the vehicle to a respective one of the points on the object;
   based on (i) the determined barrier function, (ii) the determined virtual boundary of the vehicle, and (iii) an input to at least one of propulsion, steering, or braking, determine at least one of a braking override or a steering override by solving an optimization problem including the barrier functions and one or more constraints including at least one of a maximum deceleration threshold, a maximum acceleration threshold, and a maximum steering angle; and
   based on the determination, adjust at least one of a vehicle steering or a vehicle speed.

2. The system of claim 1, wherein the object is a static object or a moving object.

3. The system of claim 1, wherein the plurality of points includes points on edges of the object.

4. The system of claim 1, wherein the instructions further include instructions to generate tracking data for the identified object and determine based on the generated tracking data whether the identified object is a static object.

5. The system of claim 1, wherein the instructions further include instructions to determine the at least one of a braking override or a steering override by solving an optimization problem to identify a set of actuations of one or more vehicle actuators that satisfy the barrier functions.

6. The system of claim 1, wherein the instructions further include instructions to:
determine a projection of the object on a ground surface based on the identified plurality of points; and
determine the at least one of a braking override or a steering override further based on the determined projection of the object.

7. The system of claim 1, wherein the instructions further include instructions to:
determine a plurality of radial zones extending from the virtual boundary; and
upon determining that the object is a static object, identify the plurality of points on the static object based on received virtual sensor data from one or more radial zones.

8. The system of claim 7, wherein the plurality of points is on more than one identified static object.

9. The system of claim 1, wherein the instructions further include instructions to:
upon determining that the object is a moving object, generate tracking data for the plurality of points on the identified moving object;
determine a speed, a heading, and a location of each of the identified plurality of points of the moving object based on the vehicle sensor data; and
determine the barrier function further based on the determined state of each of the identified plurality of points.

10. The system of claim 9, wherein the instructions further include instructions to determine a second virtual boundary for the identified object based on the plurality of points on the identified object.

11. The system of claim 10, wherein the instructions further include instructions to determine the second virtual boundary based on data, received from a vehicle sensor or a remote computer, identifying a type of the identified object.

12. A method, comprising:
determining a virtual boundary for a vehicle body based on a shape of the vehicle body; upon identifying an object, identifying a plurality of points on the object based on received sensor data;
determining a barrier function based on each of the identified plurality of points, wherein the barrier function includes a barrier distance from a reference point of the virtual boundary of the vehicle to a respective one of the points on the object;
based on (i) the determined barrier functions, (ii) the determined virtual boundary of the vehicle, and (iii) an input to at least one of propulsion, steering, or braking, determining at least one of a braking override or a steering override by solving an optimization problem including the barrier functions and one or more constraints including at least one of a maximum deceleration threshold, a maximum acceleration threshold, and a maximum steering angle; and
based on the determination, adjusting at least one of a vehicle steering or a vehicle speed.

13. The method of claim 12, further comprising generating tracking data for the identified object and determining based on the generated tracking data whether the identified object is a static object.

14. The method of claim 12, further comprising determining the at least one of a braking override or a steering override by solving an optimization problem to identify a set of actuations of one or more vehicle actuators that satisfy the barrier functions.

15. The method of claim 12, further comprising:
determining a projection of the object on a ground surface based on the identified first plurality of points; and
determining the at least one of a braking override or a steering override further based on the determined projection of the object.

16. The method of claim 12, further comprising:
determining a plurality of radial zones extending from the virtual boundary; and
upon determining that the object is a static object, identifying the plurality of points on the static object based on received virtual sensor data from one or more radial zones.

17. The method of claim 12, further comprising:
upon determining that the object is a moving object, generating tracking data for the plurality of points on the identified moving object;
determining a speed, a heading, and a location of each of the identified plurality of points of the moving object based on the vehicle sensor data; and
determining the barrier function further based on the determined state of each of the identified plurality of points.

18. The method of claim 17, further comprising determining a second virtual boundary for the identified object based on the plurality of points on the identified object.

19. The method of claim 18, further comprising determining the second virtual boundary based on data, received from a vehicle sensor or a remote computer, identifying a type of the identified object.

* * * * *